(12) United States Patent
Matsumoto et al.

(10) Patent No.: US 10,286,795 B2
(45) Date of Patent: May 14, 2019

(54) CHARGING DEVICE FOR ELECTRIC VEHICLE

(71) Applicant: MITSUBISHI ELECTRIC CORPORATION, Chiyoda-ku (JP)

(72) Inventors: Sadayuki Matsumoto, Tokyo (JP); Takuya Yabumoto, Tokyo (JP); Takayoshi Nagai, Tokyo (JP); Yoshitaka Onishi, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 193 days.

(21) Appl. No.: 15/120,306

(22) PCT Filed: Jan. 13, 2015

(86) PCT No.: PCT/JP2015/050589
§ 371 (c)(1),
(2) Date: Aug. 19, 2016

(87) PCT Pub. No.: WO2015/159560
PCT Pub. Date: Oct. 22, 2015

(65) Prior Publication Data
US 2017/0072807 A1    Mar. 16, 2017

(30) Foreign Application Priority Data

Apr. 16, 2014 (JP) .................................. 2014-084185

(51) Int. Cl.
*B60L 11/18* (2006.01)
*H02J 50/80* (2016.01)
(Continued)

(52) U.S. Cl.
CPC ............. *B60L 11/182* (2013.01); *B60L 53/12* (2019.02); *B60L 53/14* (2019.02); *B60L 53/20* (2019.02);
(Continued)

(58) Field of Classification Search
CPC ...................................................... B60L 11/182
(Continued)

(56) References Cited

U.S. PATENT DOCUMENTS

2006/0068749 A1\* 3/2006 Ismail ................. H03F 3/45968
455/339
2007/0133240 A1\* 6/2007 Manders ............. H02M 1/4225
363/74
(Continued)

FOREIGN PATENT DOCUMENTS

JP        11-252810 A    9/1999
JP      2010-213535 A    9/2010
(Continued)

OTHER PUBLICATIONS

International Search Report dated Mar. 31, 2015 in PCT/JP2015/050589 filed Jan. 13, 2015.

*Primary Examiner* — Jerry D Robbins
(74) *Attorney, Agent, or Firm* — Oblon, McClelland, Maier & Neustadt, L.L.P.

(57) ABSTRACT

A charging device for an electric vehicle includes a wireless power receiving device which receives high-frequency AC power in a non-contact state, a wired power receiving device connected to an external power source for low-frequency AC power, a rectifier which rectifies AC power, an electric power converter which is positioned at a rear part of the rectifier, and an power receiving device switching switch which switches electric power in such a way that any of electric power of both electric power receiving devices is outputted to the rectifier. A high-frequency filter, which removes a high-frequency component, is provided between the rectifier and the electric power converter.

4 Claims, 7 Drawing Sheets

(51) Int. Cl.
    *H02J 50/12*     (2016.01)
    *H02J 7/02*     (2016.01)
    *H02M 1/42*     (2007.01)
    *H02J 7/00*     (2006.01)
    *B60L 53/14*     (2019.01)
    *B60L 53/20*     (2019.01)
    *B60L 53/12*     (2019.01)

(52) U.S. Cl.
    CPC ............ *H02J 7/0055* (2013.01); *H02J 7/025* (2013.01); *H02J 50/12* (2016.02); *H02J 50/80* (2016.02); *H02M 1/4208* (2013.01); *B60L 2210/10* (2013.01); *B60L 2210/30* (2013.01); *B60L 2210/40* (2013.01); *Y02T 10/7005* (2013.01); *Y02T 10/7072* (2013.01); *Y02T 90/122* (2013.01); *Y02T 90/14* (2013.01)

(58) Field of Classification Search
    USPC ........................................................ 320/108
    See application file for complete search history.

(56) References Cited

U.S. PATENT DOCUMENTS

| | | | | |
|---|---|---|---|---|
| 2008/0252144 | A1* | 10/2008 | Wang | H02J 9/062 |
| | | | | 307/66 |
| 2011/0249476 | A1* | 10/2011 | Chen | H02H 1/0007 |
| | | | | 363/52 |
| 2012/0306439 | A1* | 12/2012 | Ichikawa | B60L 11/123 |
| | | | | 320/108 |
| 2014/0036560 | A1* | 2/2014 | Satyamoorthy | H02M 7/066 |
| | | | | 363/126 |
| 2014/0340027 | A1* | 11/2014 | Keeling | B60L 11/1829 |
| | | | | 320/108 |
| 2014/0376278 | A1* | 12/2014 | Fornage | H02M 1/42 |
| | | | | 363/21.12 |
| 2015/0200547 | A1 | 7/2015 | Nakashima et al. | |

FOREIGN PATENT DOCUMENTS

| | | |
|---|---|---|
| JP | 2014-128162 A | 7/2014 |
| WO | 2010/131348 A1 | 11/2010 |
| WO | 2014/010518 A1 | 1/2014 |

\* cited by examiner (a)

(b)

CHARGING DEVICE FOR ELECTRIC VEHICLE

TECHNICAL FIELD

The present invention relates to a charging device, for electric vehicle, for charging a battery, which is mounted on a vehicle, by an external power source of the vehicle.

BACKGROUND ART

A non-contact feeding technology, in which a magnetic field connection, such as magnetic field resonance or electromagnetic induction, is used, is expected as a technology by which a battery of a vehicle, in which battery of an electric vehicle, a plug-in hybrid electric vehicle, or a fuel-cell electric vehicle is mounted, is charged by an external power source.

There is a known charging device, for electric vehicle, having a function which corresponds to, by using the technology, a wired electric power charging operation, in which an external power source (AC power source at 50 Hz or 60 Hz) is connected to a vehicle by a conductive cable so as to charge a battery, and corresponds to a non-contact electric power charging operation, in which a vehicle is not directly connected to an external power source.

As a conventional charging device, for electric vehicle, which includes a wired electric power charging operation and a non-contact electric power charging operation, for example, a charging device, which is indicated in FIG. 6, is disclosed. In FIG. 6, when a wired electric power charging operation is performed, AC electric power from an external power source is passed through an electric power receiving terminal 101 and a inductor 102, and is inputted to a rectifier 103. In this case, the rectifier 103 includes a switching element, so that a step-up chopper circuit is configured by using the rectifier 103 and the inductor 102, and the rectifier 103 rectifies the inputted AC electric power at 50 Hz or 60 Hz, and the rectifier 103 increases a voltage and performs a power-factor improvement operation. As a result, DC electric power at a constant voltage is outputted from the rectifier 103, and is converted to high-frequency AC electric power by an inverter 104. The AC electric power, which is converted the inverter 104, is inputted a diode-bridge-type rectifier 106 including a switching element, and is converted to DC voltage, whereby a battery, which is mounted in a vehicle, is charged.

On the other hand, a wireless power receiving unit 107, which is used for a non-contact electric power receiving operation, is composed of an receiving coil 108 and a rectifier 109, and one end portion of an output terminal of the wireless power receiving unit 107 is passed through a inductor 110 and is connected to a middle point of an arm which includes the switching element of the rectifier 106, and the other end portion is connected to a low voltage side of the rectifier 106. A step-up chopper circuit is configured by using the arm which includes the inductor 110 and the switching element of the rectifier 106, so that a battery, which is mounted in a vehicle, is charged after electric power, which is outputted from the wireless power receiving unit 107, is increased.

Moreover, there is a disclosed configuration in which the rectifier 110, which is indicated in FIG. 6, is removed, and a step-down chopper circuit is configured in such a way that a inductor is arranged between a middle point of an arm and a battery, and after electric power, which is outputted from a wireless power receiving unit, is decreased, a battery, which is mounted in a vehicle, is charged (for example, refer to Patent Document 1).

Moreover, in the other conventional charging device, for electric vehicle, a common electric power converter, which is configured in such a way that a power-factor corrector is connected to a rear part of a rectifying circuit, is included, and a wired power receiving unit for a wired electric power receiving operation and a wireless power receiving unit for a non-contact electric power receiving operation are connected to a front part of the rectifying circuit in such a way that the wired power receiving unit and the wireless power receiving unit can be switched. When a wired electric power receiving operation is performed, AC electric power, which is outputted from an external power source, is passed through a filter circuit, which is composed of a inductor and a capacitor, and is inputted to the rectifying circuit. After the inputted AC electric power at 50 Hz or 60 Hz is rectified by the rectifying circuit, the AC electric power is converted to DC electric power at a constant voltage by the power-factor corrector, whereby a battery is charged.

On the other hand, when a non-contact electric power receiving operation is performed, AC electric power, which is outputted from an external power source, is rectified by a rectifying circuit so as to be converted to pulsating electric power at a non-contact-charging-type charging unit which is provided at the outside, and the AC electric power is converted to pulsating high-frequency AC electric power by a high-frequency inverter and is outputted to an transmitting coil. Thereby, a high-frequency magnetic field is generated at the transmitting coil, and the high-frequency magnetic field is magnetically connected to an receiving coil of a wireless power receiving unit at a vehicle side, whereby electric power is supplied to the wireless power receiving unit. The received electric power is pulsating high-frequency AC electric power, after the AC electric power is rectified by the rectifying circuit, the AC electric power is converted to DC electric power at a constant voltage by the power-factor corrector, whereby a battery is charged (for example, refer to Patent Document 2).

CONVENTIONAL ART DOCUMENT

Patent Document

Patent Document 1: International Publication No. WO/2010/131348 (Page 14 through Page 15, FIG. 9 and FIG. 7)
Patent Document 2: Japanese Laid-Open Patent Publication No. 2012-130193 (Page 13 through Page 14, FIG. 4)

SUMMARY OF THE INVENTION

Problems to be Solved by the Invention

In the above-described charging device, for electric vehicle, an electric power converter, which is commonly used in a wired electric power receiving operation and a non-contact electric power receiving operation, is included, so that there is a merit in which a volume can be reduced in comparison with a case in which a wired power receiving unit and a wireless power receiving unit are respectively mounted in a vehicle, and a cost of the charging device, for electric vehicle, can be reduced. However, when characteristics for the wired electric power receiving operation and the non-contact electric power receiving operation are considered, there has been a problem in that an optimum configuration is not realized in the above-described technology by the following reason.

In other words, in the charging device, for electric vehicle, which is described in Patent Document 1, a switching element is used in a rectifier which is used in only a wired electric power receiving operation in order to improve a power factor in a wired power receiving unit state, and moreover, and a rectifier which is used in only a non-contact electric power receiving operation, is provided in a wireless power receiving unit. Moreover, although a switching element is not used in a wired electric power receiving operation in the rectifier which is used as a common electric power converter, switching elements must be used in order increase or decrease a voltage in a non-contact electric power receiving operation, whereby the number of the switching elements is increased, and there have been problems for a cost and a complex control operation, and there have been problems in that a special rectifier for a wireless power receiving unit is required, and a sufficient commonality of the rectifier is not realized.

Moreover, in the charging device, for electric vehicle, which is described in Patent Document 2, a commonality of a power-factor corrector, in which a power-factor improvement operation is performed in a wired electric power receiving operation and a non-contact electric power receiving operation, is realized. However, in a wireless power receiving unit used for a vehicle, a frequency of AC electric power, which is outputted from an inverter to an transmitting coil, is a high frequency at nearly 20 kHz through 150 kHz. Although it is required that some contrivance is provided in order to convert the high-frequency AC electric power and AC electric power at 50 Hz or 60 Hz in a wired electric power receiving state to DC electric power at a constant voltage, the contrivance is not described in Patent Document 2, and there has been a problem in that a countermeasure is not sufficient.

Moreover, when a non-contact electric power receiving operation is performed, a countermeasure with respect to a particular characteristic variation for a non-contact electric power receiving operation, such as a position deviation of an transmitting coil and an receiving coil or a efficiency reduction in accordance with a variation of an equivalent resistance of a battery, which is caused by a charging condition of the battery, is not realized, so that there has been a problem in that the battery cannot be charged with sufficient high efficiency when the non-contact electric power receiving operation is performed.

The present invention has been made to solve above-described problems, and an object of the invention is to obtain a charging device, for electric vehicle, in which the number of switching elements is reduced while the charging device, for electric vehicle, corresponds to a wired electric power receiving operation and a non-contact electric power receiving operation, and a battery can be charged with sufficient high efficiency while the charging device, for electric vehicle, corresponds to a characteristic variation of the non-contact electric power receiving operation.

Means for Solving Problems

A charging device, for electric vehicle, of the present invention includes a wireless power receiving unit which receives high-frequency AC power by a magnetic field connection with a high-frequency alternating magnetic field; a wired power receiving unit which is connected to an external power source for low-frequency AC power; a rectifier which rectifies AC power which is outputted from the wireless power receiving unit and the wired power receiving unit; an electric power converter which is connected to a rear part of the rectifier; and an power receiving unit switching means which switches electric power in such a way that electric power of the wireless power receiving unit or electric power of the wired power receiving unit is outputted to the rectifier; in which a battery is charged by C power which is outputted from the electric power converter; wherein a high-frequency filter, which removes a high-frequency component included in electric power outputted from the rectifier, is provided between the rectifier and the electric power converter; and the wired power receiving unit includes a full-wave rectifier by which low-frequency AC power, which is inputted from the external power source, is rectified for a full wave, an inverter which converts pulsating electric power, which is outputted from the full-wave rectifier, to high-frequency AC power in a state where a pulsating component is maintained, and an insulated transformer which is connected to a rear part of the inverter; and the high-frequency filter removes a high-frequency component which is related to a high-frequency component of the high-frequency AC power; and when electric power is received from the wireless power receiving unit, DC power at a constant voltage is inputted to the electric power converter, and when electric power is received from the wired power receiving unit, pulsating electric power, in which a voltage waveform of the low-frequency AC power is rectified for a full wave, is inputted to the electric power converter; and when electric power is received from the wireless power receiving unit, the electric power converter performs a resistance conversion operation in which a voltage, which is inputted to the electric power converter, is increased or decreased, and outputs a constant voltage, and when electric power is received from the wired power receiving unit, the electric power converter performs a power-factor improvement operation in which a power factor of electric power, which is inputted from the external power source, is improved, and outputs a constant voltage.

Effects of the Invention

In a charging device, for electric vehicle, of the present invention, a high-frequency filter, which removes a high-frequency component included in electric power outputted from the electric power converter, is provided between the rectifier and the electric power converter; and the wired power receiving unit includes a full-wave rectifier by which low-frequency AC power, which is inputted from the external power source, is rectified for a full wave, an inverter which converts pulsating electric power, which is outputted from the full-wave rectifier, to high-frequency AC power in a state where a pulsating component is maintained, and an insulated transformer which is connected to a rear part of the inverter; and the high-frequency filter removes a high-frequency component which is related to a high-frequency component of the high-frequency AC power; and when electric power is received from the wireless power receiving unit, DC power at a constant voltage is inputted to the electric power converter, and when electric power is received from the wired power receiving unit, pulsating electric power, in which a voltage waveform of the low-frequency AC power is rectified for a full wave, is inputted to the electric power converter; and when electric power is received from the wireless power receiving unit, the electric power converter performs a resistance conversion operation in which a voltage, which is inputted to the electric power converter, is increased or decreased, and outputs a constant voltage, and when electric power is received from the wired power receiving unit, the electric power converter performs a power-factor improvement operation in which a power factor of electric power, which is inputted from the external power source, is improved, and outputs a constant voltage. Because, the high-frequency filter is provided, only a low-frequency component is inputted to the electric power converter, and a power-factor improvement operation in a wired electric power charging state and a resistance conversion operation in a non-contact electric power charging state can be easily performed. Moreover, the electric power converter, of which function is varied, is operated while the identical electric power converter is used in a wired electric power charging operation and a non-contact electric power charging operation, whereby a system, which is optimum for the both operations, can be configured.

Moreover, a charging device, for electric vehicle, having high reliability, which is insulated from an external power source, can be realized.

MODE FOR CARRYING OUT THE INVENTION

Embodiment 1

Figure 1:
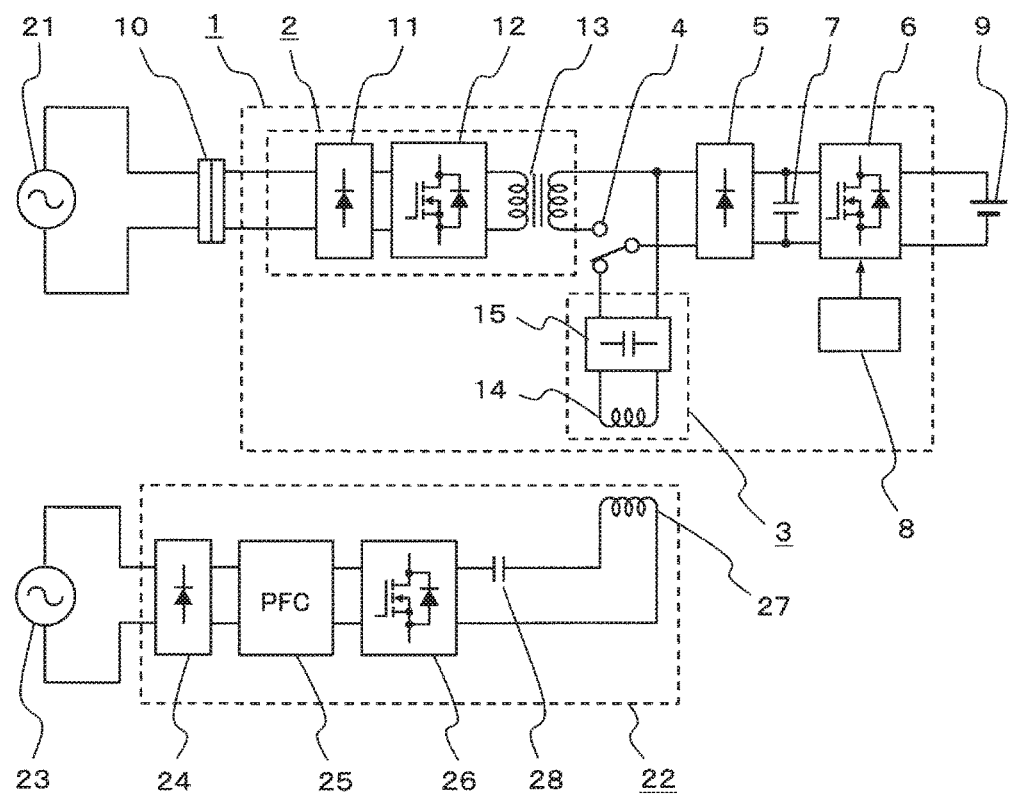
FIG. 1 is a circuit diagram illustrating a charging device, for electric vehicle, according to Embodiment 1 of the present invention.

FIG. 1 is a circuit diagram illustrating a charging device, for electric vehicle, according to Embodiment 1 of the present invention.

As illustrated in FIG. 1, a charging device 1, for electric vehicle includes a wired power receiving unit 2 and a wireless power receiving unit 3, and the wired power receiving unit 2 and the wireless power receiving unit 3 are connected to a rectifier 5 via an power receiving unit switching means 4 which is composed of a switch, a relay and the like. An electric power converter 6, which is composed of a step-up chopper circuit, a step-down chopper circuit, a step-up/step-down chopper circuit or the like, is connected at a rear part of the rectifier 5, and a high-frequency filter 7, which is composed of a film capacitor, a ceramic capacitor or the like, of which electrostatic capacitance is relatively small, is provided between the rectifier 5 and the electric power converter 6.

The high-frequency filter 7 removes or reduces a high-frequency component which is included in electric power outputted from the rectifier 5, and outputs electric power having a low-frequency component to the electric power converter 6.

The electric power converter 6 is controlled in accordance with a control signal which is outputted from a control unit 8, and the electric power converter 6 converts the inputted electric power to DC electric power at a predetermined voltage so as to output the DC electric power, whereby a battery 9 is charged.

An input terminal 10 is provided at the charging device 1, for electric vehicle in order to perform a wired electric power charging operation, and an external power source 21, which outputs AC electric power at 50 Hz or 60 Hz to the input terminal 10, is connected to the input terminal 10 by using a conductive cable or the like, whereby electric power is supplied from the external power source 21 to the charging device 1, for electric vehicle, and the wired electric power charging operation is performed.

On the other hand, when a non-contact electric power charging operation is performed, electric power at 50 Hz or 60 Hz, which is outputted from an external power source 23, is converted to a high-frequency alternating magnetic field at 20 kHz through 150 kHz by using a wireless power transmitting device 22 which is not included in the present invention, and the high-frequency alternating magnetic field is received by the wireless power receiving unit 3, whereby electric power is supplied to the charging device 1, for electric vehicle, and the non-contact electric power charging operation is performed.

A wireless communication unit is provided in a control device (not illustrated) which is provided at the inside or the outside of the charging device 1, for electric vehicle, and wireless communication is performed between the wireless communication unit and a wireless communication unit (not illustrated) which is provided at the wireless power transmitting device 22, whereby communication control of the non-contact electric power charging operation is performed.

Hereinafter, each of units will be explained in detail. The wired power receiving unit 2 includes a rectifier 11 which is configured by using a diode bridge or the like, and an inverter 12, which is configured in such a way that a semiconductor switching device, such as a MOSFET or an IGBT, is connected in a full-bridge type or a half-bridge type, is connected at a rear part of the rectifier 11, and moreover, an insulated transformer 13 is provided at a rear part of the inverter 12.

On the other hand, the wireless power receiving unit 3 is composed of an receiving coil 14 and a resonance unit 15, and an output side of the wireless power receiving unit 3 is connected to the rectifier 5 via the power receiving unit switching means 4.

Moreover, the wireless power transmitting device 22 includes a rectifier 24, which rectifies the electric power outputted from the external power source 23, a power-factor corrector 25, an inverter 26, an transmitting coil 27, and a capacitor 28. There is a case in which the capacitor 28 is connected to the transmitting coil 27 in parallel.

Figure 2:
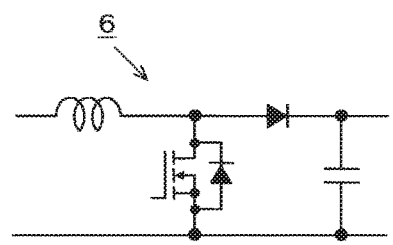
FIG. 2A is a first circuit diagram illustrating examples of an electric power converter illustrated in FIG. 1.
FIG. 2B is a second circuit diagram illustrating examples of an electric power converter illustrated in FIG. 1.
Figure 2:
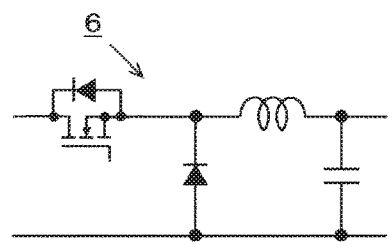
Figure 2A:
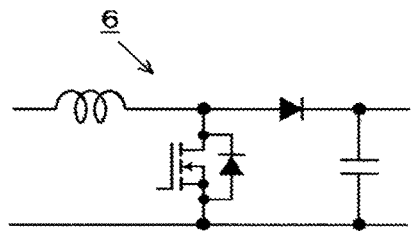
Figure 2B:
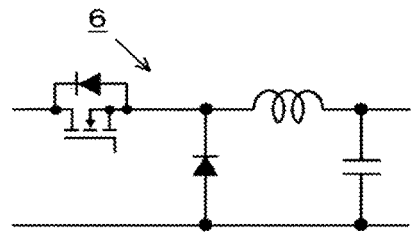

FIGS. 2A and 2B are circuit diagrams illustrating examples of the electric power converter 6 illustrated in FIG. 1. The electric power converter 6 is composed of the step-up chopper circuit, which is illustrated in FIG. 2A, or the step-down chopper circuit, which is illustrated in FIG. 2B. The chopper circuits are composed of a inductor and a semiconductor switching device, such as a MOSFET or an IGBT.

In addition, the chopper circuit has a generally known circuit configuration, so that a detailed explanation is omitted in the following description.

Hereinafter, an operation of the charging device 1, for electric vehicle, which is illustrated in FIG. 1, will be explained.

FIGS. 3A-3F are schematic diagrams illustrating voltage waveforms of each of units of the charging device 1, for electric vehicle, in a wired electric power charging state, which is illustrated in FIG. 1. A wired electric power charging operation will be firstly explained in reference to FIGS. 3A-3F. In addition, the waveforms, which are illustrated in FIGS. 3A-3F, are schematic diagrams for easily explaining the operation of each of the units, and the waveforms don't always indicate accurate waveforms.

Figure 3A:
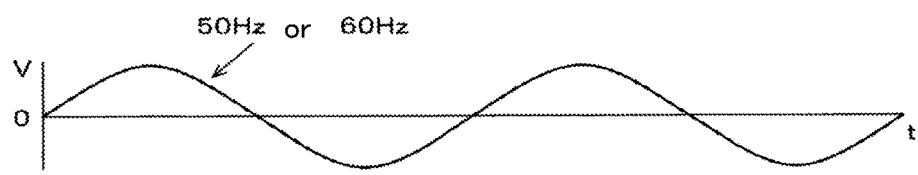
FIG. 3A is a schematic diagram illustrating a voltage waveform of a unit of the charging device, for electric vehicle, in a wired electric power charging state, according to Embodiment 1 of the present invention.

In the wired power receiving unit 2, AC power at 50 Hz or 60 Hz, which is illustrated in FIG. 3A, is inputted from the input terminal 10 to the rectifier 11. The rectifier 11 is composed of a diode bridge or the like, and the inputted AC power is rectified for a full wave by the rectifier 11.

Figure 3B:
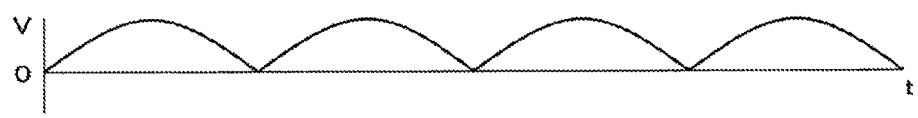
FIG. 3B is a schematic diagram illustrating a voltage waveform of a unit of the charging device, for electric vehicle, in a wired electric power charging state, according to Embodiment 1 of the present invention.

A voltage waveform, which is outputted from the rectifier 11, is indicated by a pulsating DC voltage, which is represented by an absolute value of a sinusoidal wave as illustrated in FIG. 3B, and a frequency of the pulsating DC voltage is a frequency of 2 times of the inputted AC power, in other words, the frequency of the pulsating DC voltage is 100 Hz or 120 Hz.

The pulsating DC voltage is inputted to the inverter 12 which is connected to a rear part of the inverter 12. The inverter 12 converts the inputted DC power to high-frequency electric power at 20 kHz through 150 kHz, for example, at 85 kHz so as to output the high-frequency electric power. As described above, the voltage, which is inputted to the inverter 12, is the pulsating DC voltage which is illustrated in FIG. 3B, so that a voltage waveform, which is outputted from the inverter 12, is indicated by a pulsating high-frequency AC voltage illustrated in FIG. 3C, which is proportional to the inputted pulsating DC voltage and is temporally varied.

Figure 3C:
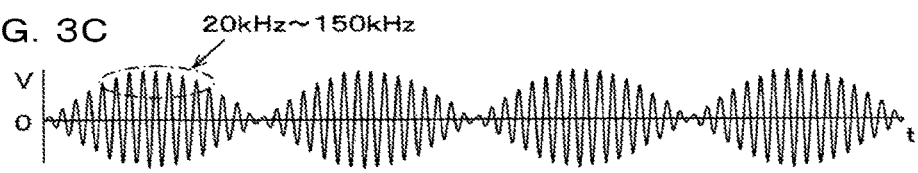
FIG. 3C is a schematic diagram illustrating a voltage waveform of a unit of the charging device, for electric vehicle, in a wired electric power charging state, according to Embodiment 1 of the present invention.

The high-frequency AC voltage is inputted to the insulated transformer 13 which is connected to a rear part of the inverter 12, and the high-frequency AC voltage is outputted from the insulated transformer 13 in a state where the high-frequency AC voltage is increased or decreased at a voltage which is determined in accordance with a turn ratio of the insulated transformer 13, or the high-frequency AC voltage is not varied. A voltage waveform, which is outputted from the insulated transformer 13, is similar to the inputted voltage waveform which is illustrated in FIG. 3C.

Figure 3D:
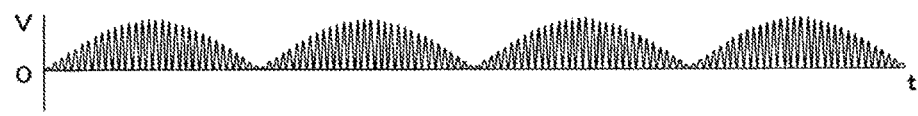
FIG. 3D is a schematic diagram illustrating a voltage waveform of a unit of the charging device, for electric vehicle, in a wired electric power charging state, according to Embodiment 1 of the present invention.

When a wired electric power charging operation is performed, the power receiving unit switching means 4 is selected in such a way that the battery 9 is charged by the electric power of the wired power receiving unit 2, so that the pulsating high-frequency electric power, which is outputted from the insulated transformer 13, is inputted to the rectifier 5, and the high-frequency electric power, of which waveform is illustrated in FIG. 3D, is outputted from the rectifier 5 in a state where a pulsating component of the inputted electric power is maintained.

The high-frequency filter 7, which is composed of, for example, a capacitor, is connected between a high-voltage side and a low-voltage side of an output terminal of the rectifier 5, so that a high-frequency variable component, in the electric power including the pulsating component, which is outputted from the rectifier 5, is passed through the capacitor, so that the high-frequency variable component is removed or reduced, and almost all of a low-frequency variable component is not reduced and is inputted to the electric power converter 6.

Figure 3E:
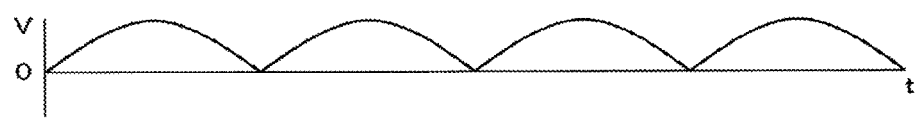
FIG. 3E is a schematic diagram illustrating a voltage waveform of a unit of the charging device, for electric vehicle, in a wired electric power charging state, according to Embodiment 1 of the present invention.

In this case, when the high-frequency filter 7 is not provided, the voltage waveform including a low-frequency pulsating component and a high-frequency component, which is illustrated in FIG. 3D, is directly outputted from the rectifier 5. However, the high-frequency filter 7 is provided in the charging device 1, for electric vehicle of the present invention, so that the voltage waveform is converted to a voltage waveform, which is illustrated in FIG. 3E, and is outputted from the rectifier 5.

In the above-described explanation, the low-frequency component represents a frequency component which is related to a frequency of the external power source 21 at 50 Hz or 60 Hz, and in particular, the low-frequency component is rectified for a full wave by the rectifier 11, so that the low-frequency component represents a frequency component which mainly includes a frequency component at 100 Hz or 120 Hz, of which frequency is 2 times of the frequency of external power source 21. On the other hand, the high-frequency component represents a frequency component which is related to a switching frequency of the inverter 12, and although high-frequency AC power at 20 kHz through 150 kHz is outputted from the inverter 12, and the high-frequency AC power is rectified by the rectifier 5, so that in particular, the high-frequency component represents a frequency component which mainly includes a frequency component at 40 kHz through 300 kHz, of which frequency is 2 times of the high-frequency AC power. In addition, when a half-wave rectifier circuit is used for the rectifier 5, the high-frequency component represents a frequency component at 20 kHz through 150 kHz, of which frequency is identical to the switching frequency of the inverter 12.

In other words, the high-frequency filter 7 removes a frequency component, of which frequency is 20 kHz or higher than 40 kHz, from the outputted electric power of the rectifier 5, and a low-frequency component, of which frequency is lower than 120 Hz, is mainly outputted to the electric power converter 6, and there is a difference being greater than 166-fold between the separated frequencies (When a high-frequency component is 20 kHz and a low-frequency component is 120 Hz, 20000/120=166.7), so that a capacitor, such as a film capacitor or a ceramic capacitor, of which electrostatic capacitance is relatively small, can be used for the high-frequency filter 7, and the high-frequency filter 7 can be simply configured.

In addition, although an aluminum electrolytic capacitor or the like can be used for the high-frequency filter 7, when the aluminum electrolytic capacitor has an excessive electrostatic capacitance, a value of a low-frequency component is lower than a required value, and a power factor of the electric power, which is inputted from the external power source 21 to the charging device 1, for electric vehicle, is decreased, so that even when an aluminum electrolytic capacitor is used, it is preferable that an aluminum electrolytic capacitor, of which electrostatic capacitance is small, is used. In particular, it is preferable that a capacitor, of which electrostatic capacitance is lower than 100 µF, is used, and it is preferable that a capacitor, of which electrostatic capacitance is 0.1 µF through 10 µF.

Moreover, the high-frequency filter 7 may have the above-described function, so that a inductor and a capacitor are combined, and the high-frequency filter 7 may be formed by configuring a filter which is equivalent to a communication filter.

Figure 3F:
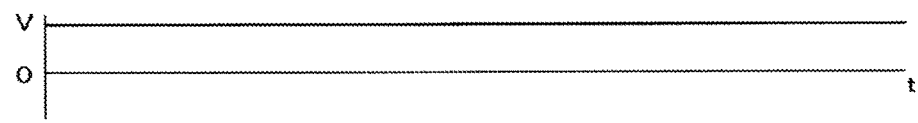
FIG. 3F is a schematic diagram illustrating a voltage waveform of a unit of the charging device, for electric vehicle, in a wired electric power charging state, according to Embodiment 1 of the present invention.

The semiconductor switching device of the electric power converter 6 is switched at predetermined timing in accordance with a control signal which is outputted from the control unit 8, whereby a voltage having a waveform illustrated in FIG. 3E, which is inputted to the electric power converter 6, is converted to DC power at a constant voltage value, which is in FIG. 3F, so as to be outputted.

When the electric power, which is outputted from the wired power receiving unit 2, is inputted to the electric power converter 6 in accordance with a selection of the power receiving unit switching means 4, the electric power converter 6 controls a switching by the control unit 8 so as to perform a power-factor improvement operation. The power-factor improvement operation is an operation in which the DC power, which is outputted from the electric power converter 6, is controlled at a constant voltage while a current waveform of electric power, which is inputted from the external power source 21 to the charging device 1, for electric vehicle, is closed to a voltage waveform which is inputted from the external power source 21. Moreover, the DC power, which is outputted from the electric power converter 6, is supplied to the battery 9 which is connected to a rear part of the electric power converter 6, whereby the battery 9 is charged.

Hereinafter, a non-contact electric power charging operation will be explained.

FIGS. 4A-4E are schematic diagrams illustrating voltage waveforms of each of units of the charging device 1, for electric vehicle, in a non-contact electric power charging state, which is illustrated in FIG. 1. In addition, the waveforms, which are illustrated in FIGS. 4A-4E, are illustrated in order to easily explaining the operation of each of the units, and the waveforms don't always indicate accurate waveforms.

As explained in reference to FIG. 1, the wireless power receiving unit 3 is composed of the receiving coil 14 and the resonance unit 15, and the outputted electric power of the wireless power receiving unit 3 is inputted to the rectifier 5 via the power receiving unit switching means 4.

The resonance unit 15 is composed of a capacitor, which is connected to the receiving coil 14 in parallel, or a capacitor or the like, which is connected to the receiving coil 14 in series, and the resonance unit 15 is selected in such a way that a resonance frequency, which is determined in accordance with an inductance of the receiving coil 14 and an electrostatic capacitance of the resonance unit 15, is identical to a frequency of an alternating magnetic field which is magnetically connected to the receiving coil 14. The alternating magnetic field is generated by the wireless power transmitting device 22 which is provided at the outside of the charging device 1, for electric vehicle.

Figure 4A:
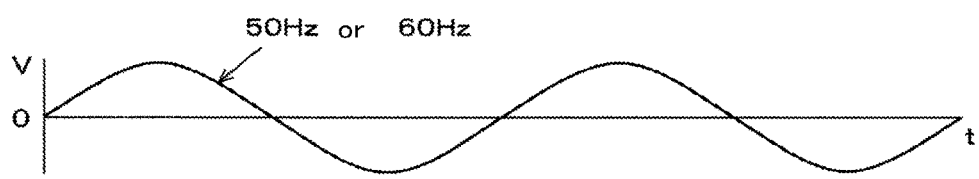
FIG. 4A is a schematic diagram illustrating a voltage waveform of a unit of the charging device, for electric vehicle, in a non-contact electric power charging state, according to Embodiment 1 of the present invention.
Figure 4B:
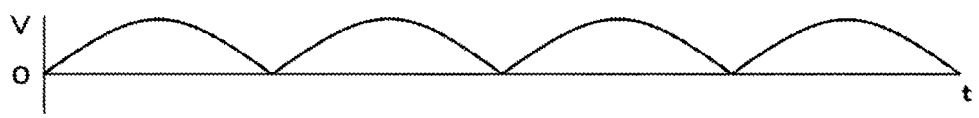
FIG. 4B is a schematic diagram illustrating a voltage waveform of a unit of the charging device, for electric vehicle, in a non-contact electric power charging state, according to Embodiment 1 of the present invention.
Figure 4C:
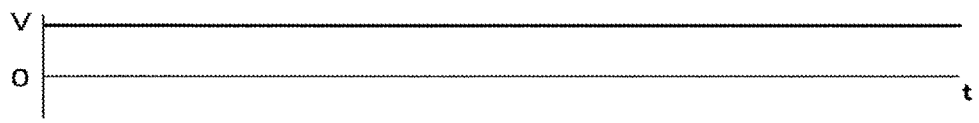
FIG. 4C is a schematic diagram illustrating a voltage waveform of a unit of the charging device, for electric vehicle, in a non-contact electric power charging state, according to Embodiment 1 of the present invention.

The wireless power transmitting device 22 is connected to the external power source 23 which outputs AC power at 50 Hz or 60 Hz, which is illustrated in FIG. 4A, and is configured by a circuit which is explained in reference to FIG. 1, and an electrostatic capacitance of the capacitor 28 is selected in such a way that a resonance frequency, which is determined in accordance with an electrostatic capacitance of the capacitor 28 and an inductance of the transmitting coil 27, is nearly identical to a frequency of high-frequency electric power which is outputted from the inverter 26. The AC power, which is inputted from the external power source 23, is rectified for a full wave by the rectifier 24 as illustrated in FIG. 4B, and the AC power is converted, by the power-factor corrector 25, to DC power at a constant voltage as illustrated in FIG. 4C, and the DC power is supplied to the inverter 26.

The inverter 26 is configured in such a way that a semiconductor switching device, such as a MOSFET or an IGBT, is connected in a full-bridge type or a half-bridge type, and a switching operation is performed at 20 kHz through 150 kHz, for example, at 85 kHz, whereby the inverter 26 outputs high-frequency AC power at 85 kHz, and high-frequency AC current is passed through the transmitting coil 27. The DC power, which is supplied to the inverter 26, is electric power at a constant voltage, so that the high-frequency AC current, which is passed through the transmitting coil 27, does not include a low-frequency variable component which is related to a frequency of the external power source 23 at 50 Hz or 60 Hz. When the high-frequency AC current is passed through the transmitting coil 27, an alternating magnetic field, which is varied at 20 kHz through 150 kHz, for example, at 85 kHz of which frequency is identical to a frequency of the high-frequency AC current, is generated at the transmitting coil 27.

Figure 4D:
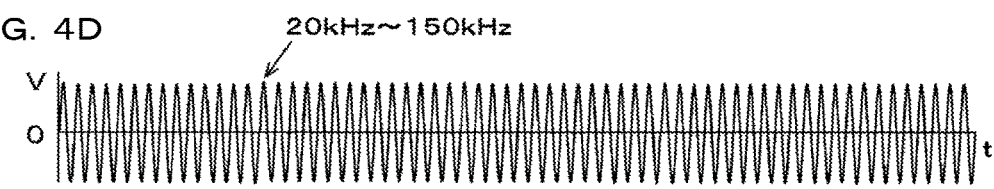
FIG. 4D is a schematic diagram illustrating a voltage waveform of a unit of the charging device, for electric vehicle, in a non-contact electric power charging state, according to Embodiment 1 of the present invention.

The alternating magnetic field is magnetically connected to the receiving coil 14 of the wireless power receiving unit 3 of the charging device 1, for electric vehicle, whereby high-frequency AC power, which is illustrated in FIG. 4D, is outputted from the wireless power receiving unit 3.

The power receiving unit switching means 4 is switched in a state where the high-frequency AC power is received from the wireless power receiving unit 3, whereby the high-frequency AC power is supplied to the rectifier 5. Although the high-frequency AC power is rectified for a full wave or rectified for a half wave by the rectifier 5 as described above, a low-frequency component, which is related to a frequency of the external power source 23, is not included in electric power which is outputted from the rectifier 5, and only a high-frequency component, which is related to a frequency at 20 kHz through 150 kHz, which is outputted from the wireless power transmitting device 22, is included. The high-frequency component is removed or reduced by the high-frequency filter 7 so as to be inputted to the electric power converter 6.

Figure 4E:
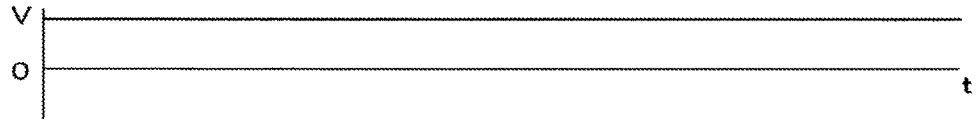
FIG. 4E is a schematic diagram illustrating a voltage waveform of a unit of the charging device, for electric vehicle, in a non-contact electric power charging state, according to Embodiment 1 of the present invention.

In other words, even when some voltage variation is caused, DC power at an approximately constant voltage, which is illustrated in FIG. 4E, is inputted to the electric power converter 6. The voltage of the DC power, which is inputted to the electric power converter 6, is increased or decreased in such a way that the semiconductor switching device composing the electric power converter 6 is controlled in accordance with a control signal which is outputted from the control unit 8, and the DC power, in which the voltage is increased or decreased, is converted to DC power at a constant voltage by the electric power converter 6 so as to be outputted. The DC power is supplied to the battery 9 which is connected to the electric power converter 6, whereby a non-contact electric power charging operation is performed.

When the non-contact electric power charging operation is performed, a positional relation between the transmitting coil 27 and the receiving coil 14 is not usually constant, and a positional deviation is caused in a horizontal direction in accordance with competence of a driver which operates a vehicle in which the charging device 1, for electric vehicle is mounted, or a positional deviation is caused in a vertical direction in accordance with a weight of an object which is mounted in the vehicle. The positional deviations are indicted as a variation of a connection coefficient between the transmitting coil 27 and the receiving coil 14.

When the non-contact electric power charging operation is performed, it is known that a value of a load resistance, by which electric power can be transmitted at the highest efficiency, is determined in accordance with the connection coefficient, and when the positional deviations are caused, the value of the load resistance is varied to an optimum value, whereby the electric power can be constantly transmitted at high efficiency.

In the charging device 1, for electric vehicle of the present invention, when the non-contact electric power charging operation is performed, the electric power converter 6 increases a voltage of DC electric power at an approximately constant voltage, whereby the DC electric power is converted to DC electric power at a higher constant voltage, or the electric power converter 6 decreases a voltage of DC electric power, whereby the DC electric power is converted to DC electric power at a lower constant voltage. In other words, when a loss of the electric power converter 6 is neglected, input power of the electric power converter 6 is identical to output power of the electric power converter 6, so that when the electric power is increased, an input equivalent resistance of the electric power converter 6 is converted to a larger output equivalent resistance, and when the electric power is decreased, the input equivalent resistance of the electric power converter 6 is converted to a smaller output equivalent resistance.

When the battery 9 is charged, an equivalent resistance of the battery 9 is determined in accordance with a state of a charge of the battery 9, in other words, the equivalent resistance is determined in accordance with a terminal voltage and charging electric power, and the equivalent resistance is not related to an optimum load resistance which is determined in accordance with the connection coefficient between the transmitting coil 27 and the receiving coil 14. Therefore, a value of the equivalent resistance of the battery 9 is converted to a value of the optimum load resistance of a non-contact electric power charging operation, whereby efficiency of the non-contact electric power charging operation can be improved.

In particular, when the value of the equivalent resistance of the battery 9 is smaller than the value of the optimum load resistance of the non-contact electric power charging operation, and when a step-down operation of the electric power converter 6 is performed, the input equivalent resistance of the electric power converter 6 is larger than the output equivalent resistance of the electric power converter 6, so that the equivalent resistances of the electric power converter 6 and the battery 9 can be larger than the equivalent resistance of the battery 9, and a step-down ratio of the electric power converter 6 is optimally controlled, whereby the value of the equivalent resistance can be matched to the value of the optimum load resistance of the non-contact electric power charging operation.

In contrast, when the value of the equivalent resistance of the battery 9 is larger than the value of the optimum load resistance of the non-contact electric power charging operation, and when a step-up operation of the electric power converter 6 is performed, the input equivalent resistance of the electric power converter 6 is smaller than the output equivalent resistance of the electric power converter 6, so that the equivalent resistances of the electric power converter 6 and the battery 9 can be lower than the equivalent resistance of the battery 9, and a step-up ratio of the electric power converter 6 is optimally controlled, whereby the value of the equivalent resistance can be matched to the value of the optimum load resistance of the non-contact electric power charging operation.

As described above, when the non-contact electric power charging operation is performed, although the electric power converter 6 increases or decreases a constant voltage, which is inputted to the electric power converter 6, and outputs the voltage, the operation is referred as a resistance conversion operation in the present invention. In this case, the constant voltage represents that it is a constant voltage with respect to time which is longer than 10 mm second or 8.33 mm second, which is a half cycle of 50 Hz or 60 Hz, and represents that some voltage variation (an input voltage ripple or an output voltage ripple) may be caused. In other words, the resistance conversion operation may represent an operation in which an up-step ratio or a down-step ratio of the electric power converter 6 is constantly control during time which is longer than 10 mm second or 8.33 mm second. When the battery 9 is charged, a terminal voltage is increased in accordance time passage, and a voltage, which is outputted from the electric power converter 6, is varied, so that the resistance conversion operation is mentioned as described above. However, it is estimated that a terminal voltage of the battery 9 in an electric power charging state is an approximately constant voltage during 10 mm second or 8.33 mm second, and the electric power converter 6 can be controlled during 10 mm second or 8.33 mm second, in a state where the up-step ratio or the down-step ratio of the electric power converter 6 is constant.

In contrast, when a wired electric power charging operation is performed, the electric power converter 6 performs a power-factor improvement operation. In this case, although a voltage, which is inputted to the electric power converter 6, is greatly varied in a half cycle at 50 Hz or 60 Hz, a voltage, which is outputted from the electric power converter 6, is a constant voltage, so that when a step-up operation of the electric power converter 6 is performed so as to improve a power factor, a step-up ratio is varied at multiple times during 10 mm second or 8.33 mm second, and when a step-down operation of the electric power converter 6 is performed so as to improve the power factor, a step-down ratio is varied at multiple times during 10 mm second or 8.33 mm second.

As described above, although the charging device 1, for electric vehicle of the present invention uses the common electric power converter 6 in a case where a wired electric power charging operation is performed or in a case where a non-contact electric power charging operation is performed, a power-factor improvement operation is performed in a case where the wired electric power charging operation is performed, and a resistance conversion operation is performed in a case where the non-contact electric power charging operation is performed, so that the number of semiconductor switching devices is not increased, and a function, which is required in the wired electric power charging operation and the non-contact electric power charging operation, can be realized, and the charging device 1, for electric vehicle, of which size is small and a cost is low, can be realized.

Moreover, as described above, when a frequency of high-frequency AC power, which is outputted from the inverter 12 of the wired power receiving unit 2, is roughly identical to a frequency of a high-frequency alternating magnetic field which is received at the wireless power receiving unit 3, in other words, when an inductance of the receiving coil 14 is roughly identical to a resonance frequency which is determined in accordance with an electrostatic capacitance of the resonance unit 15, a frequency of a high-frequency component, which must be removed by the high-frequency filter 7, is identical to a frequency in a wired electric power charging state and a frequency in a non-contact electric power charging state, so that even when the high-frequency filter 7 is simply configured in such a way that the high-frequency filter 7 is configured by using a capacitor, the high-frequency component can be removed in a high performance state, and a power-factor improvement operation and a resistance conversion operation can be easily performed by the electric power converter 6.

In addition, the power receiving unit switching means 4, which selects that the electric power is received from the wired power receiving unit 2 or the electric power is received from the wireless power receiving unit 3, may have not a configuration illustrated in FIG. 1, and the power receiving unit switching means 4 may have a configuration in which the electric power is received from the wired power receiving unit 2 or the wireless power receiving unit 3 in such a way that a switch and a relay are provided at a position which is different from a position indicated in FIG. 1.

Moreover, the power receiving unit switching means 4 may have a configuration as described in the following description in such a way that a switch and a relay are not provided. In other words, when a non-contact electric power charging operation is performed, as described above, the communication control of the non-contact electric power charging operation is performed by using the wireless communication between a vehicle, in which the charging device 1, for electric vehicle is mounted, and the wireless power transmitting device 22, so that when a cable used for the wired electric power receiving operation is connected to the input terminal 10, the wireless power transmitting device 22 is stopped in such a way that the wireless power transmitting device 22 is stopped by using the wireless communication from the vehicle, and the electric power is received from the wired power receiving unit 2, whereby an operation of the power receiving unit switching means 4 may be realized.

As described above, a charging device, for electric vehicle, according to Embodiment 1 includes a wireless power receiving unit which receives high-frequency AC power by a magnetic field connection with a high-frequency alternating magnetic field; a wired power receiving unit which is connected to an external power source for low-frequency AC power; a rectifier which rectifies AC power which is outputted from the wireless power receiving unit and the wired power receiving unit; an electric power converter which is connected to a rear part of the rectifier; and an power receiving unit switching means which switches electric power in such a way that electric power of the wireless power receiving unit or electric power of the wired power receiving unit is outputted to the rectifier; in which a battery is charged by DC power which is outputted from the electric power converter; wherein a high-frequency filter, which removes a high-frequency component included in electric power outputted from the rectifier, is provided between the rectifier and the electric power converter; and when electric power is received from the wireless power receiving unit, the electric power converter performs a resistance conversion operation in which a voltage, which is inputted to the electric power converter, is increased or decreased, and outputs a constant voltage, and when electric power is received from the wired power receiving unit, the electric power converter performs a power-factor improvement operation in which a power factor of electric power, which is inputted from the external power source, is improved, and outputs a constant voltage. Because, the high-frequency filter is provided, only a low-frequency component is inputted to the electric power converter, and a power-factor improvement operation in a wired electric power charging state and a resistance conversion operation in a non-contact electric power charging state can be easily performed.

Moreover, the electric power converter, of which function is varied, is operated while the identical electric power converter is used in a wired electric power charging operation and a non-contact electric power charging operation, whereby a system, which is optimum for the both operations, can be configured.

Moreover, the high-frequency filter removes a high-frequency component which is related to a high-frequency component of high-frequency AC power, and when electric power is received from the wireless power receiving unit, DC power at a constant voltage is inputted to the electric power converter by the high-frequency filter and when electric power is received from the wired power receiving unit, pulsating electric power, in which a voltage waveform of low-frequency AC power is rectified for a full wave, is inputted to the electric power converter, so that a high frequency of electric power, which is inputted to the electric power converter can be effectively removed by using one high-frequency filter, and a power-factor improvement operation in a wired electric power charging state and a resistance conversion operation in a non-contact electric power charging state can be effectively performed.

Moreover, the high-frequency filter is composed of a capacitor which is connected between a high voltage side and a low voltage side of an output terminal of the rectifier, so that the high-frequency filter can be realized by a simple method.

Moreover, the wired power receiving unit includes a full-wave rectifier by which low-frequency AC power, which is inputted from the external power source, is rectified for a full wave, an inverter which converts pulsating electric power, which is outputted from the full-wave rectifier, to high-frequency AC power, and an insulated transformer which is connected to a rear part of the inverter, so that the charging device, for electric vehicle, which is insulated from the external power source, can be realized.

Moreover, a frequency of high-frequency AC power, which is outputted from the inverter, is identical to a frequency of high-frequency AC power, which is received by the wireless power receiving unit, so that high-frequency components, which must be removed, are identical each other in both the wired power receiving unit and the wireless power receiving unit, so that a high-frequency removing capability can be removed by a simple configuration.

Embodiment 2

Figure 5:
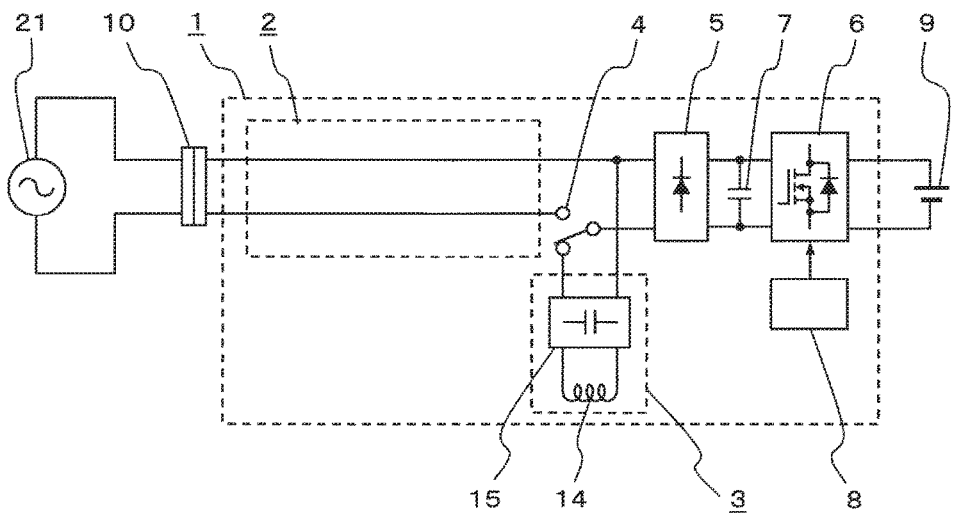
FIG. 5 is a circuit diagram illustrating a charging device, for electric vehicle, according to Embodiment 2 of the present invention.
Figure 6:
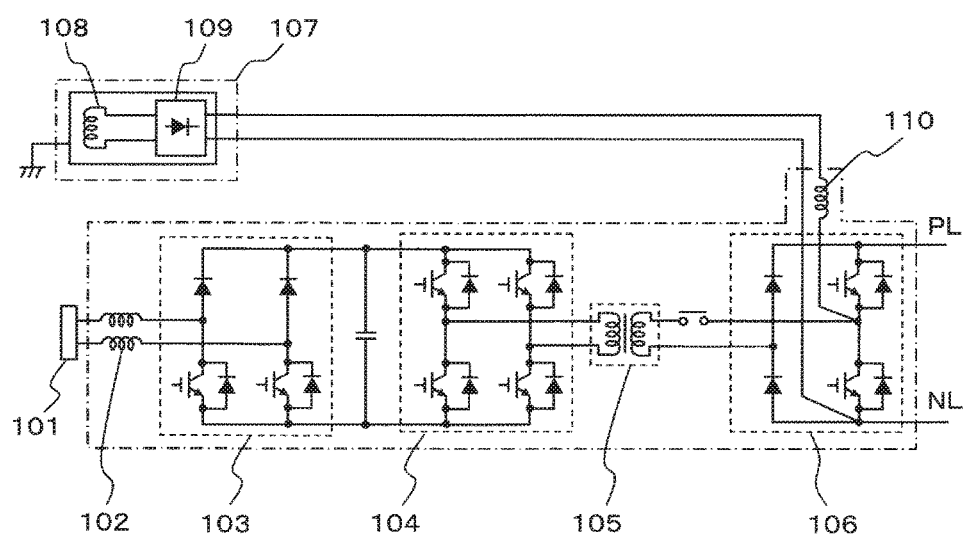
FIG. 6 is a circuit diagram illustrating a conventional charging device for electric vehicle.

FIG. 5 is a circuit diagram illustrating a charging device, for electric vehicle, according to Embodiment 2. In the charging device 1, for electric vehicle according to Embodiment 2, a configuration and an operation, which are corresponded to a non-contact electric power receiving mechanism, are equivalent to those indicated in FIG. 1 according to Embodiment 1, so that a partial view for a wireless power transmitting device 22 is omitted. Moreover, reference symbols, which are the same as those in FIG. 1, refer to the same parts, and an explanation is omitted. A difference with respect to FIG. 1 is a configuration of a wired power receiving unit 2. In the charging device 1, for electric vehicle according to Embodiment 2, the charging device 1, for electric vehicle is not insulated from an external power source 21 at the wired power receiving unit 2. Hereinafter, a difference with respect to Embodiment 1 will be mainly explained.

As illustrated in FIG. 5, the wired power receiving unit 2 of the charging device 1, for electric vehicle is composed of only conductive wires which connect an input terminal 10 and a rectifier 5. However, the charging device 1, for electric vehicle includes an power receiving unit switching means 4 by which a wired electric power charging operation and a non-contact electric power charging operation are switched. When the wired electric power charging operation is performed, the power receiving unit switching means 4 is switched to the wired power receiving unit 2, whereby the rectifier 5 is directly connected to the external power source 21 via the conductive wires of the wired power receiving unit 2 and the input terminal 10. In addition, a noise cut filter or the like may be provided at the conductive wires of the wired power receiving unit 2.

It is a characteristic of the charging device 1, for electric vehicle according to Embodiment 2 that electric power, which is outputted from the external power source 21, is not converted, and is directly inputted to the rectifier 5. Moreover, the rectifier 5 in the charging device 1, for electric vehicle according to Embodiment 2 is a full-wave rectifier which is composed of a diode bridge or the like.

Hereinafter, an operation of the charging device 1, for electric vehicle will be explained.

When a wired electric power charging operation is performed, AC power at 50 Hz or 60 Hz, which is illustrated in FIG. 3A according to Embodiment 1, is inputted from the external power source 21 to the rectifier 5 in a state where the AC power is not converted. The AC power, which is inputted to the rectifier 5, does not include a high-frequency component, so that a high-frequency filter 7, which is connected to a rear part of the rectifier 5, does not perform a special operation, and the AC power at 50 Hz or 60 Hz, which is inputted to the rectifier 5, is rectified for a full wave as illustrated in FIG. 3B or FIG. 3E, and is inputted to an electric power converter 6. Because the wired electric power charging operation is selected, the electric power converter 6 is controlled by a control unit 8 so as to perform a power-factor improvement operation, and DC power at a constant voltage is outputted from the electric power converter 6, whereby a battery 9 is charged.

On the other hand, when a non-contact electric power charging operation is performed, the power receiving unit switching means 4 is switched to a wireless power receiving unit 3, whereby a non-contact electric power charging operation, which is similar to a non-contact electric power charging operation explained in Embodiment 1, is performed. When the non-contact electric power charging operation is performed, a high-frequency component at 20 kHz through 150 kHz is included in electric power which is outputted from the rectifier 5, so that the high-frequency filter 7 removes the high-frequency component, and DC power at an approximately constant voltage is inputted to the electric power converter 6.

As described above, it is not required that a high-frequency component, which is explained in Embodiment 1, is always included in electric power which is inputted to the rectifier 5 when a wired electric power charging operation is performed, and a non-contact electric power charging operation, which always includes a high-frequency component, is balanced with a wired electric power charging operation, which does not include a high-frequency component, whereby an effect, which is similar to an effect in a case according to Embodiment 1, can be obtained.

As described above, in the charging device 1, for electric vehicle according to Embodiment 2, the units except for the wired power receiving unit 2 are similar to those in the charging device 1, for electric vehicle according to Embodiment 1, and the wired power receiving unit 2 directly outputs electric power, which is inputted from the external power source 21, to the rectifier 5, so that a power-factor improvement operation in a wired electric power charging state and a resistance conversion operation in a non-contact electric power charging state is performed by a simple configuration while the identical electric power converter 6 is used in a wired electric power charging operation and a non-contact electric power charging operation, and a system, which is optimum for both operations, can be configured.

Embodiment 3

Figure 7:
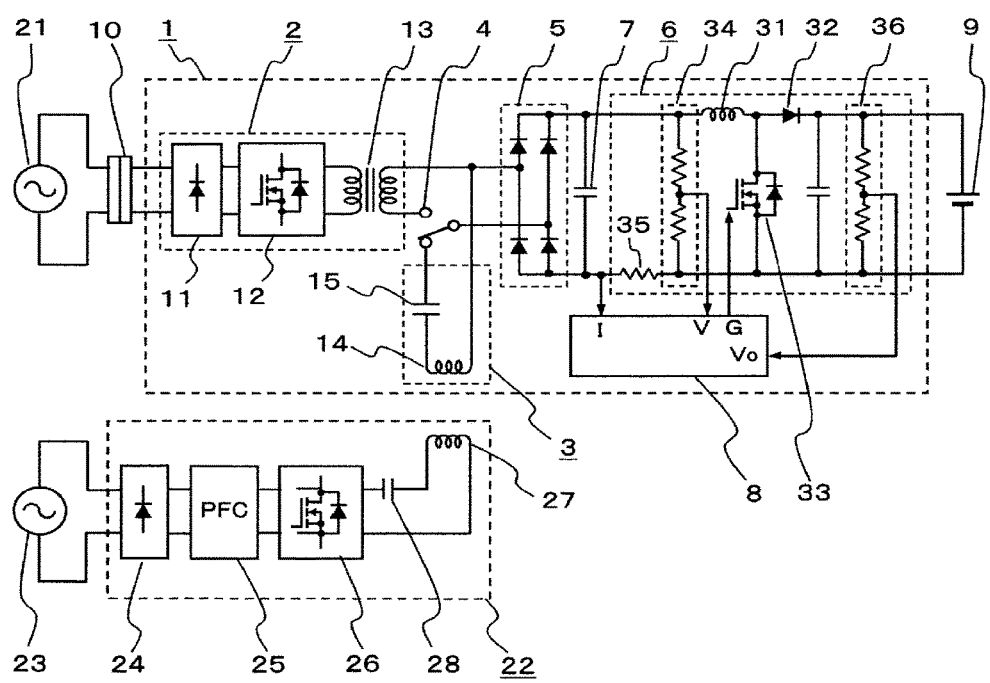
FIG. 7 is a circuit diagram illustrating a charging device, for electric vehicle, according to Embodiment 3 of the present invention.

FIG. 7 is a circuit diagram illustrating a charging device, for electric vehicle, according to Embodiment 3. In a charging device 1, for electric vehicle according to Embodiment 3, which is similar to the charging device 1, for electric vehicle described in Embodiment 1, a battery 9 and an external power source 21 are insulated by an insulated transformer 13 when a wired electric power charging operation is performed. Reference symbols, which are the same as those in FIG. 1 according to Embodiment 1, refer to the same parts, and an explanation is omitted.

Although the charging device 1, for electric vehicle, which is illustrated in FIG. 7, has a configuration which is similar to a configuration described in Embodiment 1, the charging device 1, for electric vehicle indicates a more particular configuration. In other words, in a wireless power receiving unit 3, an receiving coil 14 and a resonance unit 15, which is composed of a capacitance, are connected in series, and an electric power converter 6 is composed of a step-up chopper circuit which is indicated in FIG. 2A. When the step-up chopper circuit is used as a power-factor corrector, the step-up chopper circuit can obtain a power factor which is higher than a power factor of a step-down chopper circuit, so that the step-up chopper circuit is excellent when it is used as a power-factor corrector.

The step-up chopper circuit is composed of a inductor 31, a diode 32, and a semiconductor switching device 33, such as a MOSFET or an IGBT.

Although one inductor 31, one diode 32, and one semiconductor switching device 33 are provided in FIG. 7, and the step-up chopper circuit is configured, a plurality of combinations of the units are connected in parallel, whereby the step-up chopper circuit may have a configuration which is referred to as a interleave type.

For example, although it is a characteristic in two parallel interleave types that a switching phase of the semiconductor switching device 33 is deviated at a half cycle, a basic operation is similar to an operation of an single type. Moreover, the single type and the interleave type can performs a power-factor improvement operation in a wired electric power charging state and a resistance conversion operation in a non-contact electric power charging state, a commonality of the electric power converter 6, which is an object of the present invention, can be realized.

Because the charging device 1, for electric vehicle operates high electric power, although it is suitable that the step-up chopper circuit is configured in a interleave type, the step-up chopper circuit is described by using a single type in order to simply explain the step-up chopper circuit in this case.

At an input side of the electric power converter 6, the electric power converter 6 includes a voltage detection unit 34 which detects a voltage waveform which is inputted to the electric power converter 6, an current detection unit 35 which measures a current waveform which is passed through the inductor 31, and a voltage detection unit 36 which measures a voltage which is outputted from the electric power converter 6.

As illustrated in FIG. 7, although each of the voltage detection unit 34 and the voltage detection unit 36 indicates a configuration in which two resistances are connected in series, and a resistance partial pressure circuit, which measures a voltage at a midpoint of the resistances, is included, the other configuration may be used.

The current detection unit 35 may be composed of a shunt resistance and a current transformer, and the current detection unit 35 may be connected to the inductor 31 in series, which is arranged at a high voltage side which is different from a low voltage side as illustrated in FIG. 7. Moreover, the current detection unit 35 may be connected to the semiconductor switching device 33 in series, and a value of electric current, which is passed through the inductor 31 when the semiconductor switching device 33 is turned on (in a conductive state), may be measured.

Hereinafter, an operation of the charging device 1, for electric vehicle will be explained. A wired electric power charging operation will be firstly explained.

When the wired electric power charging operation is performed, an power receiving unit switching means 4 is connected to a secondary side of the insulated transformer 13, which is an output terminal of a wired power receiving unit 2, and is connected to a rectifier 5. In this case, although a high-frequency AC voltage at 20 kHz through 150 kHz, in which an envelope is pulsating current as indicated in FIG. 3C, is inputted to the rectifier 5, electric power, in which a high-frequency component, which is related high-frequency electric power caused by switching an inverter 12 at 20 kHz through 150 kHz as indicated in FIG. 3E, is removed by a high-frequency filter 7, is inputted to an output terminal of the rectifier, in other words, to an input terminal of the electric power converter 6 which is composed of a step-up chopper circuit.

Because the wired electric power charging operation is performed, the electric power converter 6 performs a power-factor improvement operation. The power-factor improvement operation is operated in such a way that a voltage waveform, which is inputted from the external power source 21 to the charging device 1, for electric vehicle via an input terminal 10, is similar to a current waveform, and a power factor is closed to 1. In other words, the voltage waveform is similar to the current waveform at a position of the input terminal 10, whereby the power factor is closed to 1.

In a usual case, when the power-factor improvement operation is operated, the voltage waveform of the external power source 21 is measured at a position which is adjacent to the input terminal 10, and a turn-on operation and a turn-off operations of the semiconductor switching device 33 are controlled in such a way that an input electric current is closed to the voltage waveform which is measured.

Even in the charging device 1, for electric vehicle according to Embodiment 3, a primary side of the insulated transformer 13, which is used for detecting a voltage waveform, is connected to a part adjacent to the input terminal 10, for example, to a front part of a rectifier 11, and an output at a secondary side of the insulated transformer 13 is inputted to a control unit 8, whereby a power-factor improvement operation can be performed by the electric power converter 6.

A main circuit side, by which electric power is supplied from the external power source 21 to the battery 9, is insulated by the insulated transformer 13, so that the insulated transformer 13 for detecting a voltage is used.

However, as indicated in Embodiment 3, a high-frequency component, which is caused by a switching operation of the inverter 12, is removed by the high-frequency filter 7 which is provided between the rectifier 5 and the electric power converter 6, and a voltage waveform, which is similar to a voltage waveform which is inputted from the external power source 21 and is rectified for a full wave as indicated in FIG. 3E, is inputted to the electric power converter 6, so that a similar waveform, in which the voltage waveform inputted from the external power source 21 is rectified for a full wave, is detected by an easy operation by the voltage detection unit 34 which is provided at an input terminal of the electric power converter 6, and the voltage waveform can be used for a power-factor improvement operation.

In this case, the easy operation represents that a circuit can be simply configured because it is not required that the control unit 8 and the voltage detection unit 34 are insulated.

An output voltage waveform V, which is outputted from the voltage detection unit 34, is inputted to the control unit 8, and a gate signal G of the semiconductor switching device 33 is outputted in such a way that an average current waveform, which is passed through the inductor 31, is identical to a similar waveform of the output voltage waveform V, whereby the semiconductor switching device 33 is turned on or turned off.

An electric current, which is passed through the inductor 31, is increased when the semiconductor switching device 33 is turned on, and the electric current is decreased when the semiconductor switching device 33 is turned off. Therefore, the electric current, which is passed through the inductor 31, is increased or decreased while the semiconductor switching device 33 is turned on or turned off. In other words, the average current, which is passed through the inductor 31, represents that an average value of the electric current is similar to the output voltage waveform V during a cycle which is longer than a turned-on/off cycle of the semiconductor switching device 33.

In this case, a voltage waveform, which is inputted to the electric power converter 6, is similar to a voltage waveform in which a high-frequency component is removed by the high-frequency filter 7 as indicated in FIG. 3E, and the voltage waveform at 50 Hz or 60 Hz is rectified for a full wave, so that a switching frequency of the semiconductor switching device 33 of the electric power converter 6 can be determined without relating to a switching frequency of the inverter 12. In other words, the witching frequency of the semiconductor switching device 33 may be lower than, or may be higher than, or may be identical to the switching frequency of the inverter 12.

Moreover, the witching frequency of the semiconductor switching device 33 may be varied in accordance with a voltage of the external power source 21 at a 100 V line or a 200 V line. Furthermore, the switching frequency of the semiconductor switching device 33 of the electric power converter 6 can be determined without relating to the switching frequency of the inverter 12, so that the switching frequency of the semiconductor switching device 33 may be maintained at a constant value, and the switching frequency of the inverter 12 may be varied in accordance with a condition.

As described above, when electric power is supplied from the external power source 21 to the battery 9 via the insulated transformer 13 in a wired electric power charging state, a high-frequency component, which is related to high-frequency electric power generated by the inverter 12, is removed by the high-frequency filter 7, whereby the switching frequency of the inverter 12 and the switching frequency of the semiconductor switching device 33 of the electric power converter 6 can be independently determined, so that there is a merit in which an overall system can be controlled in a more optimum state.

When electric power is continuously supplied to the battery 9, a voltage of the battery 9 is increased, so that it is required that a voltage, which must be outputted from the electric power converter 6, is varied. The voltage detection unit 36, which is connected to an output side of the electric power converter 6, inputs the measured voltage Vo to the control unit 8, and the control unit 8 controls a ratio between turn-on time and turn-off time, in other words, a duty ratio of the semiconductor switching device 33 of the electric power converter 6 in accordance with a variation of a terminal voltage of the battery 9, whereby the voltage detection unit 36 regulates the voltage which is outputted from the electric power converter 6.

As described above, a DC voltage, which is must be outputted from the electric power converter 6, is varied in accordance with a condition, and when the switching frequency of the semiconductor switching device 33 of the electric power converter 6 can be freely selected as described above, a flexibility is expanded for controlling an overall system, so that there is a merit in which an overall system can be controlled in a more optimum state.

Hereinafter, an operation of the charging device 1, for electric vehicle in a non-contact electric power charging state will be explained.

When a non-contact electric power charging operation is performed, the power receiving unit switching means 4 is switched to the wireless power receiving unit 3, and the wireless power receiving unit 3, in which the receiving coil 14 and the resonance unit 15 composed of a capacitor are connected in series, is connected to an input terminal of the rectifier 5. When a non-contact electric power charging operation is performed, a wireless power transmitting device 22 includes a power-factor corrector 25, so that pulsating current at a low frequency, which is related to a frequency of external power source 23, is not caused, and a high-frequency electric power at 20 kHz through 150 kHz, in which a value of an envelope is constant as indicated in FIG. 4D, is received by the wireless power receiving unit 3. The high-frequency electric power at 20 kHz through 150 kHz is rectified by the rectifier 5.

A high-frequency component, which is included in outputted electric power from the rectifier 5 and is related to the received high-frequency electric power at 20 kHz through 150 kHz, is removed by the high-frequency filter 7, so that an input voltage value of the electric power converter 6 is converted to a constant voltage value as indicated in FIG. 4E.

The voltage value is detected by the voltage detection unit 34, and is inputted to control unit 8 as a voltage value V. Moreover, an electric current, which is inputted to the electric power converter 6, is detected by the current detection unit 35, and is inputted to the control unit 8 as a current value I. Moreover, the control unit 8 measures the voltage Vo of the battery 9 by using the voltage detection unit 36 which is provided at an output terminal of the electric power converter 6. The control unit 8 controls a ratio between turn-on time and turn-off time, in other words, a duty ratio of the semiconductor switching device 33 of the electric power converter 6 in such a way that the DC voltage V, which is inputted to the electric power converter 6 as indicated in FIG. 4D, is converted to the voltage Vo of the battery 9.

The electric power converter 6 is composed of a step-up chopper circuit, so that the voltage V, which is increased at a step-up voltage which is defined in accordance with the duty ratio and is inputted, is converted to the output voltage Vo. In this case, when a loss of the electric power converter 6 is ignored, input electric power of the electric power converter 6 is identical to output electric power of the electric power converter 6, so that the input voltage V is lower than the output voltage Vo, and an input electric current is larger than an output electric current. Therefore, an input resistance value is smaller than an output resistance value, so that a resistance value of the battery 9 is converted to a smaller resistance value by the electric power converter 6.

A high-frequency component, which is related to high-frequency electric power which is received by the receiving coil 14, is removed by the high-frequency filter 7, so that an input voltage and an output voltage of the electric power converter 6 is a DC voltage, and a switching frequency of the semiconductor switching device 33 can be determined without relating to the high-frequency electric power which is received by the receiving coil 14.

In other words, the switching frequency of the semiconductor switching device 33 may be higher than, or may be lower than, or may be identical to the frequency of the high-frequency electric power which is received by receiving coil 14. The inductor 31 of the electric power converter 6 is commonly used in a power-factor improvement operation in a wired electric power charging state and in a resistance conversion operation in a non-contact electric power charging state, so that it is suitable that the switching frequency of the semiconductor switching device 33 in the resistance conversion operation in the non-contact electric power charging state is identical or equivalent to the power-factor improvement operation in the wired electric power charging state.

In the charging device 1, for electric vehicle according to Embodiment 1, a high-frequency is removed by the high-frequency filter 7, and when the wired electric power charging operation is performed, an input voltage waveform of the electric power converter 6 is converted to a pulsating voltage waveform in which a low-frequency AC voltage at 50 Hz or 60 Hz is rectified for a full wave, and when the non-contact electric power charging operation is performed, the input voltage waveform is converted to a DC voltage waveform at a constant voltage, so that it can be maintained that the switching frequency of the semiconductor switching device 33 of the electric power converter 6 is identical or equivalent, and even when a common inductor 31 is used in the power-factor improvement operation and the resistance conversion operation, optimum performance can be obtained.

In addition, a merit, which is obtained by freely selecting the switching frequency of the semiconductor switching device 33 when the non-contact electric power charging operation is performed, is similar to a merit which is described when the wired electric power charging operation is performed.

Embodiment 4

Figure 8:
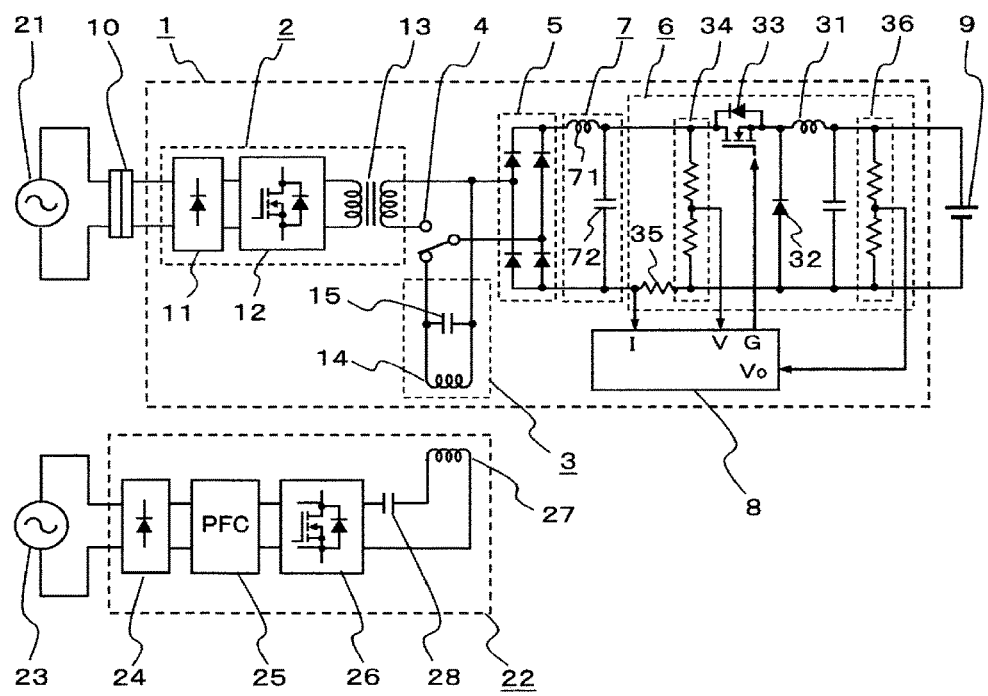
FIG. 8 is a circuit diagram illustrating a charging device, for electric vehicle, according to Embodiment 4 of the present invention.

FIG. 8 is a circuit diagram illustrating a charging device, for electric vehicle, according to Embodiment 4. Reference symbols, which are the same as those in FIG. 7 according to Embodiment 3, refer to the same parts, and an explanation is omitted.

A charging device 1, for electric vehicle according to Embodiment 4 is different from the charging device 1, for electric vehicle according to Embodiment 3, and an electric power converter 6 is composed of a step-down chopper circuit. In a wireless power receiving unit 3, an receiving coil 14 and a capacitor, which is a resonance unit 15, are connected in parallel. When the wireless power receiving unit 3 is configured in such a way that the receiving coil 14 and the capacitor, which is the resonance unit 15, are connected in parallel as indicated in FIG. 8, a step-down converter is more suitable than a step-up converter when the converter is used as a DC/DC converter which performs a resistance conversion operation in a non-contact electric power charging state. Therefore, the electric power converter 6 is composed of the step-down chopper circuit.

Moreover, in this case, a high-frequency filter 7 is composed of a filter circuit which includes a inductor 71, of which inductance is relatively small, and a capacitor 72. Although the high-frequency filter 7 has a characteristic in which a frequency at 100 Hz or 120 Hz, which is a frequency of 2 times of AC power at 50 Hz or 60 Hz, which is rectified for a full wave, is passed through, the high-frequency filter 7 has a characteristic in which a high-frequency component of a high frequency at 20 kHz through 150 kHz is interrupted.

Therefore, when a wired electric power charging operation is performed, a voltage waveform, in which an AC voltage at 50 Hz or 60 Hz is rectified for a full wave as indicated FIG. 3E, is inputted to the electric power converter 6, and when a non-contact electric power charging operation is performed, a DC voltage at a constant voltage is inputted to the electric power converter 6 as indicated FIG. 4E. Moreover, when the wired electric power charging operation is performed, a power-factor improvement operation is performed by controlling a turned-on/off operation of a semiconductor switching device 33 of the electric power converter 6, and when the non-contact electric power charging operation is performed, a resistance conversion operation is performed by controlling a turned-on/off operation of the semiconductor switching device 33.

A switching frequency of the semiconductor switching device 33 can be freely selected as described in Embodiment 3. The electric power converter 6 is composed of the step-down chopper circuit, so that when the resistance conversion operation in a non-contact electric power charging state is performed, a voltage, which is lower than an input voltage of the electric power converter 6, is outputted from the electric power converter 6 and is applied to a battery 9. On the other hand, although a step-down operation is performed when a power-factor improvement operation in a wired electric power charging state is performed, a voltage of an external power source 21 is inputted from a 100 V line or a 200 V line, and there is a case in which the voltage of the external power source 21 is lower than a voltage of the battery 9.

In this case, when a step-up transformer is configured in such a way that the number of a secondary winding of an insulated transformer 13 is greater than the number of a primary winding of then insulated transformer 13, and even when the electric power converter 6 is composed of the step-down chopper circuit, the power-factor improvement operation is performed, and a high power ratio can be obtained at an input terminal of the charging device for electric vehicle.

As described above, in the charging device 1, for electric vehicle of the present invention, an identical circuit can be used in an electric power converter, in which a power-factor improvement operation in a wired electric power charging state is performed, and in an electric power converter, in which a resistance conversion operation in a non-contact electric power charging state is performed, so that the charging device 1, for electric vehicle can be downsized.

In addition, in the scope of the present invention, it is possible that each of embodiments is freely combined, or each of embodiments is suitably modified or omitted.

DESCRIPTION OF THE SYMBOLS

"1" is a charging device for electric vehicle; "2," a wired power receiving unit; "3," a wireless power receiving unit; "4," an power receiving unit switching means; "5," a rectifier; "6," an electric power converter; "7," a high-frequency filter; "8," a control unit; "9," a battery; "10," an input terminal; "11," a rectifier; "12," an inverter; "13," an insulated transformer; "14," an receiving coil; "15," a resonance unit; "21," an external power source; "22," a wireless power transmitting device; "23," an external power source; "24," a rectifier; "25," a power-factor corrector; "26," an inverter; "27," an transmitting coil; "28," a capacitor; "31," a inductor; "32," a diode; "33," a semiconductor switching device; "34," a voltage detection unit; "35," a current detection unit; "36," a voltage detection unit; "71," a inductor; and "72" a capacitor.

What is claimed is:

1. A charging device for an electric vehicle, the charging device comprising:
    a wireless power receiving device which receives high-frequency AC power by a magnetic field connection with a high-frequency alternating magnetic field;
    a wired power receiving device which is connected to an external power source for low-frequency AC power;
    a rectifier which rectifies AC power which is outputted from the wireless power receiving device and the wired power receiving device;
    an electric power converter which is connected to a rear part of the rectifier and includes at least one switching element;
    an power receiving device switching switch which switches electric power in such a way that electric power of the wireless power receiving device or electric power of the wired power receiving device is outputted to the rectifier; and
    a controller which controls the switching element in which a battery is charged by DC power which is outputted from the electric power converter, wherein
    a high-frequency filter, which removes a high-frequency component included in electric power outputted from the rectifier, is provided between the rectifier and the electric power converter,
    the wired power receiving device includes a full-wave rectifier by which low-frequency AC power, which is inputted from the external power source, is rectified for a full wave, an inverter which converts pulsating electric power, which is outputted from the full-wave rectifier, to high-frequency AC power in a state where a pulsating component is maintained, and an insulated transformer which is connected to a rear part of the inverter,
    the high-frequency filter removes a high-frequency component which is related to a high-frequency component of the high-frequency AC power,
    when electric power is received from the wireless power receiving device, DC power at a constant voltage is inputted to the electric power converter,
    when the electric power is received from the wired power receiving device, pulsating electric power, in which a voltage waveform of the low-frequency AC power is rectified for a full wave, is inputted to the electric power converter,
    when the electric power is received from the wireless power receiving device, the controller controls the switching element in such way that the controller performs, by controlling the switching element, a resistance conversion operation in which a voltage, which is inputted to the electric power converter, is increased or decreased, and outputs a constant voltage,
    when the electric power is received from the wired power receiving device, the controller controls the switching element in such way that the controller performs, by controlling the switching element, a power-factor improvement operation in which a power factor of electric power, which is inputted from the external power source, is improved, and outputs a constant voltage,
    when the electric power is received from the wireless power receiving device, the controller controls a ratio between a voltage, which is inputted to the electric power converter, and a voltage, which is outputted from the electric power converter, in accordance with a state of a charge of the battery,
    when an equivalent resistance of the battery is smaller than a load resistance, a step-down operation of the electric power converter is performed by the controller, the load resistance being determined in accordance with a connection coefficient between an electric power receiving coil, which is included in the wireless power receiving device, and an electric power transmission coil, which is connected to the electric power receiving coil, and
    when the equivalent resistance of the battery is larger than the load resistance, a step-up operation of the electric power converter is performed by the controller.

2. The charging device as recited in claim 1, wherein the high-frequency filter is composed of a capacitor which is connected between a high voltage side and a low voltage side of an output terminal of the rectifier.

3. The charging device as recited in claim 2, wherein a frequency of high-frequency AC power that is outputted from the inverter is identical to a frequency of a high-frequency AC power that is received by the wireless power receiving device.

4. The charging device as recited in claim 1, wherein a frequency of the high-frequency AC power that is outputted from the inverter[H] is identical to a frequency of a high-frequency AC power that is received by the wireless power receiving device.

* * * * *